United States Patent [19]

Atwood

[11] Patent Number: 5,048,327
[45] Date of Patent: Sep. 17, 1991

[54] MASS AIR FLOW METER

[76] Inventor: Robert K. Atwood, 3450 John R. Rd., Rochester, Mich. 48063

[21] Appl. No.: 524,581

[22] Filed: May 17, 1990

[51] Int. Cl.$^5$ .......................................... G01M 19/00
[52] U.S. Cl. ................................ 73/118.2; 73/204.21
[58] Field of Search ............ 73/118.2, 204.11, 204.18, 73/204.21

[56] References Cited

U.S. PATENT DOCUMENTS 4,366,704 1/1983 Sato et al. ........................... 73/118.2
4,517,837 5/1985 Oyama ........................... 73/118.2 X Primary Examiner—Jerry W. Myracle
Attorney, Agent, or Firm—William L. Fisher

[57] ABSTRACT

Improvements in a mass air flow meter for internal combustion engines are disclosed which comprise structure for improving the flow dynamics of the air flow through the sampling path including expansion of the dynamic range and increase of the signal to noise ratio resulting in improved engine performance, fuel efficiency, and emission control. Such structure includes a sample tube being tapered in decreasing area in the direction of air flow therethrough and a pneumatic equivalent of a low pass R C filter which decouples the high turbulence in the main flow through the venturi, averages same and provides a scaled down profiled flow through the sample tube for measurement by a transducer in the sample tube, the measurements having an accuracy of ±2% of reading.

18 Claims, 12 Drawing Sheets

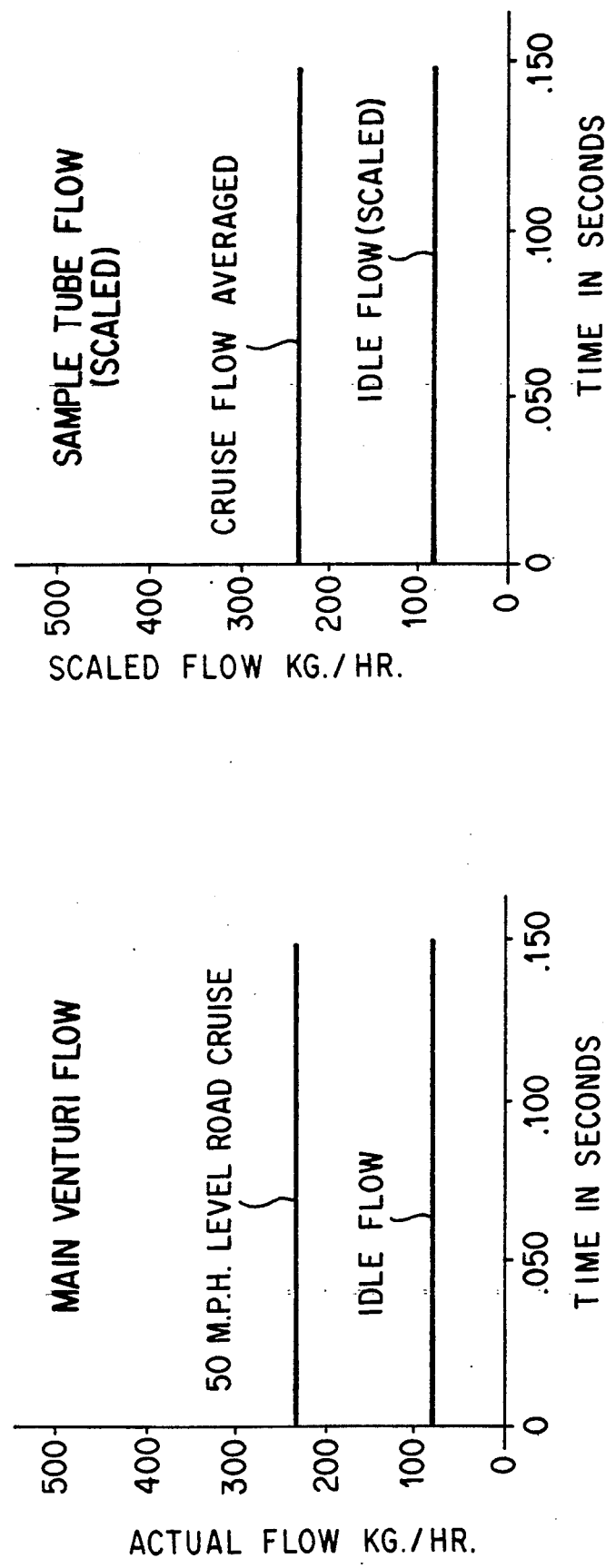

MASS AIR FLOW METER

My invention relates to a mass air flow meter with Air Cleaner for measuring the flow of air mass inducted into an internal combustion engine for controlling the air/fuel ratio thereof. The principal object of my invention is to provide an improved mass air flow meter which is characterized by very low pressure drop, improved transduction accuracy, low transduction noise; and high efficiency (reducing the work the engine must do to breathe).

The foregoing object of my invention and the advantages thereof will become apparent during the course of the following description, taken in conjunction with the accompanying drawings in which:

FIG. 1 is a vertical sectional view of a prior art mass airflow meter (as disclosed in U.S. Pat. No. 4,393,697);

FIGS. 11A through 11D are a series of graphs illustrating averaging effect of my sampling system on the pulsating flow through the main venturi;

BACKGROUND

Figure 1:
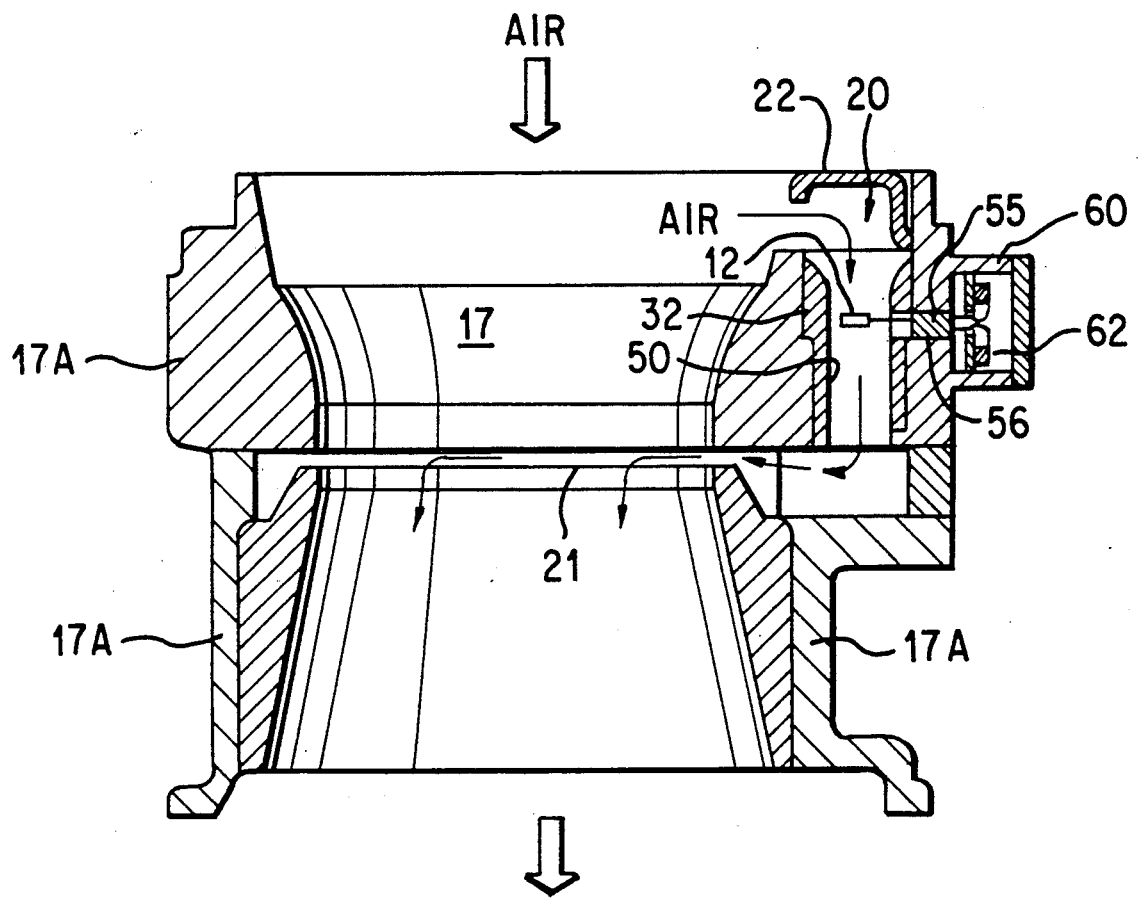
Figure 2:
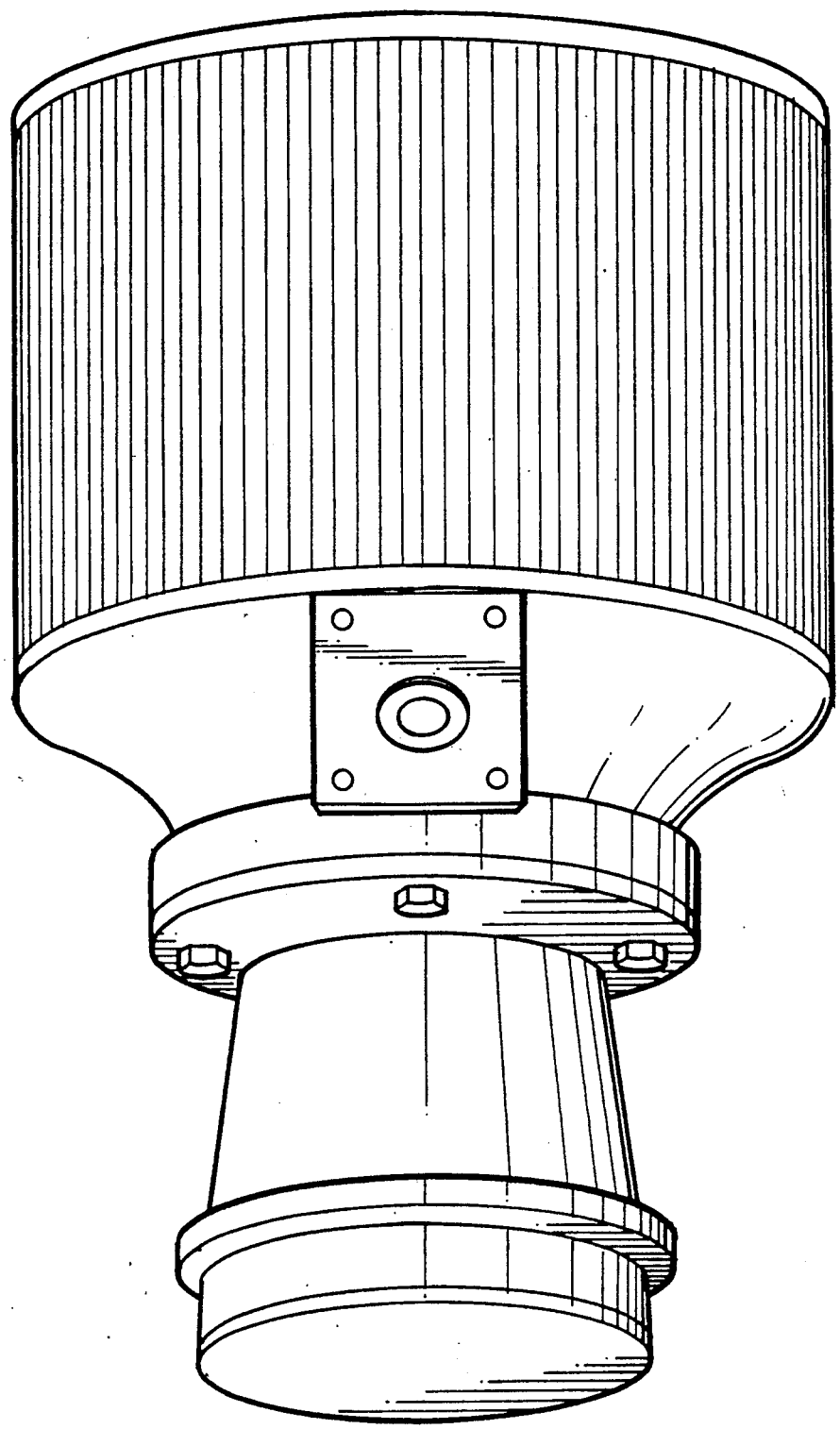
FIG. 2 is a perspective view of my air flow meter (with filter) viewed so that the mounting surface thereof (for a sensing element shown detached in this Fig.) can be seen.
Figure 3:
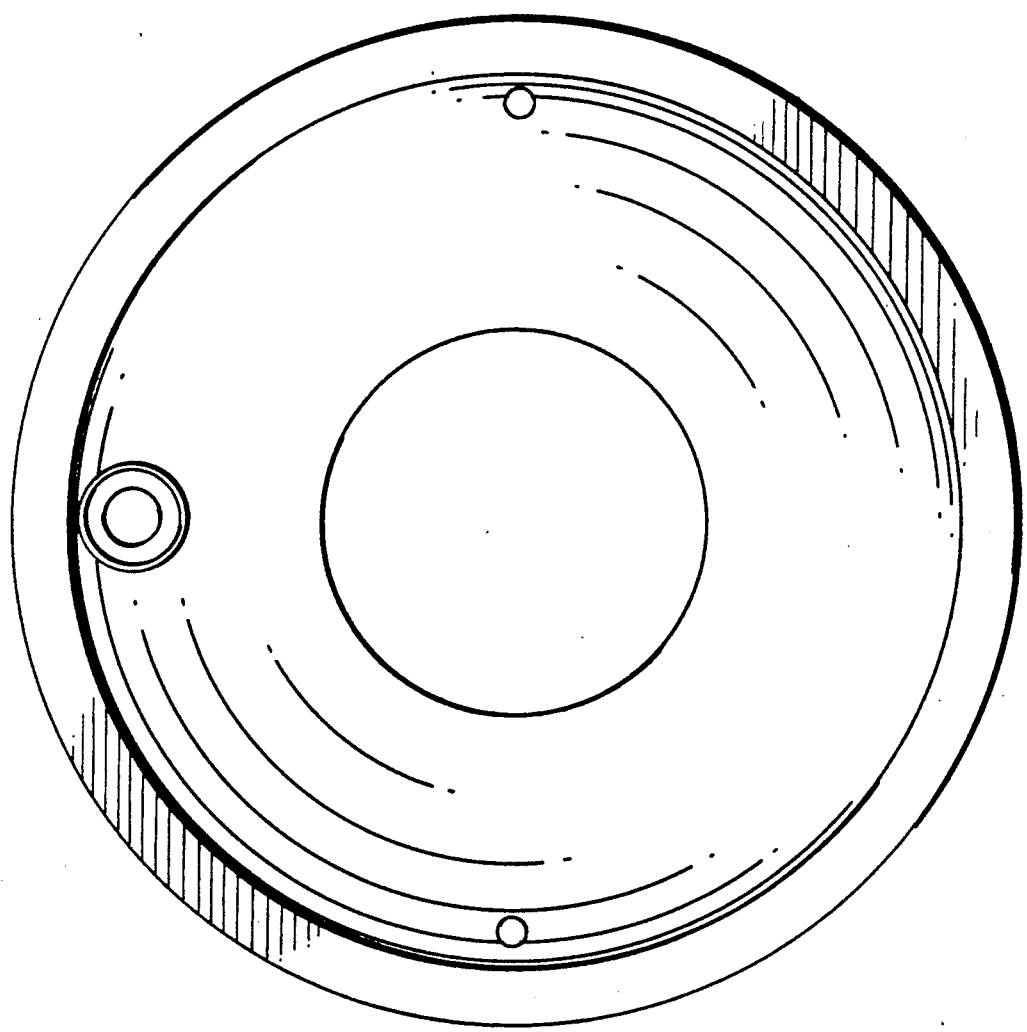
FIGS. 3 and 4 are respectively, top plan of my air flow meter (with the air cleaner detached) and bottom plan view of my air flow meter.
Figure 4:
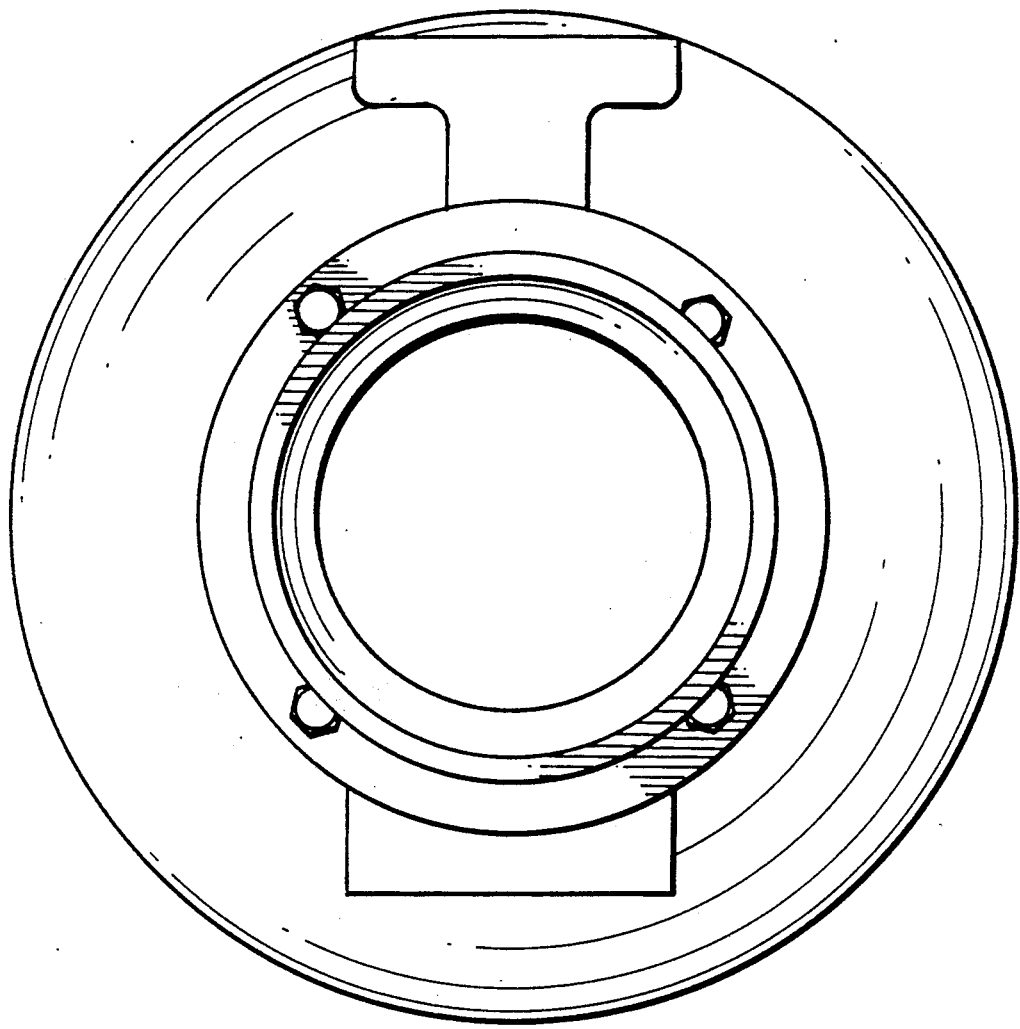

The need for this invention is to fill anticipated needs of the 1994 emission requirements for better and more accurate control of air/fuel ratio in internal combustion engines.

The major problems with the present meters available are:

1. present meters always have a high pressure drop across the meter that causes the horsepower to be reduced (at sea level 8 to 14% at 5000 ft. this loss goes to 11 to 20%). My meter has a very low pressure drop because of pressure recovery system designed in. (13 in. H2O drop vs. 3 in. H2O).

2. Low dynamic range of the Present meter will read from 13 to 850 Kg./Hr. with 4% accuracy and 12% noise. My meter has a range of 17 to 2000 Kg./Hr. with 3% accuracy and less than 3% noise.

3. High noise above idle to mid throttle makes the present meter unsure of the actual air intake. System as measured have as high as 12% noise from 30 to 90 Kg./Hr. My meter the same area has less than 1% noise making open loop air fuel calculations in the emission control system at least 8 to 12 times better. Increasing accuracy in air fuel ratio makes the emissions better and reduces air pollution.

4. The present intake system introduces further restriction by an air cleaner that has a very high pressure drop and routes the incoming air through a tortuous path which restricts the maximum horsepower by another 5 to 12% and increases the work that the engine has to do without any benefit. My system close couples a very low restriction air cleaner that reduces the work the engine has to do to breathe.

5. The present air meters are such that changes in throttle angle (demand for power) and upstream and downstream tubes and components have a large effect on the transducer calibration curve. Simple moving of tubes or changing to another type of air cleaner may change air meter transduction characteristics by 4 to 7%. My system is not affected by these conditions because of my design of the intake for the main flow and the sample system including the tapered sample tube and distribution ring.

6. Present air meters have fast transduction response times and the output(electrical transduced signal) is averaged over the input cycle to allow the computer to find the intake air mass. This practice generally runs the engine rich because the flow curve is a function of the volts plus a constant raised to the 3.3 power. When this is done the average volts calculated through the function is always less than the average of flow. This can be fixed if the engine control computer is able to calculate many times over the intake stroke, sum the flows and then divide by the number of observations. This takes large amounts of computer time and is not possible without a very fast and sophisticated computer. My system has a filtering network built into the sample system that filters the pulsating main flow to provide a sample flow that is representative of the average flow through the main venturi. The flow through the sample system is at a very low differential pressure and is in the laminar flow regime. The flow signal is the representative of the averaged flow through the main venturi over 24 to 65 ms.

DESCRIPTION

By way of a tradename or trademark for my mass air flow meter I prefer to describe it as the "Pro (M̄)" meter (or "Pro-M-Dot" meter)

My mass air flow meter has size specifications as follows (see FIG. 5):

Overall Height (H) of meter is 2.5 times the throat diameter (TD)

The Height (Hep) of the bell entrance plane (EP) upstream from the throat dia. (TD) shall be 1.3 times the throat diameter (TD)

The height of the recovery system Hrc shall be a minimum of 1.25 times the throat dia (TD)

Overall diameter at upstream end (Dmax) is 2 times throat diameter (TD)

Diameter at the downstream end (Dout) is 1.3 times throat diameter (TD)

The height (ACh) and diameter (ACd) of the air cleaner shall be each a minimum of 1.9 throat diameters (TD)

Figure 6:
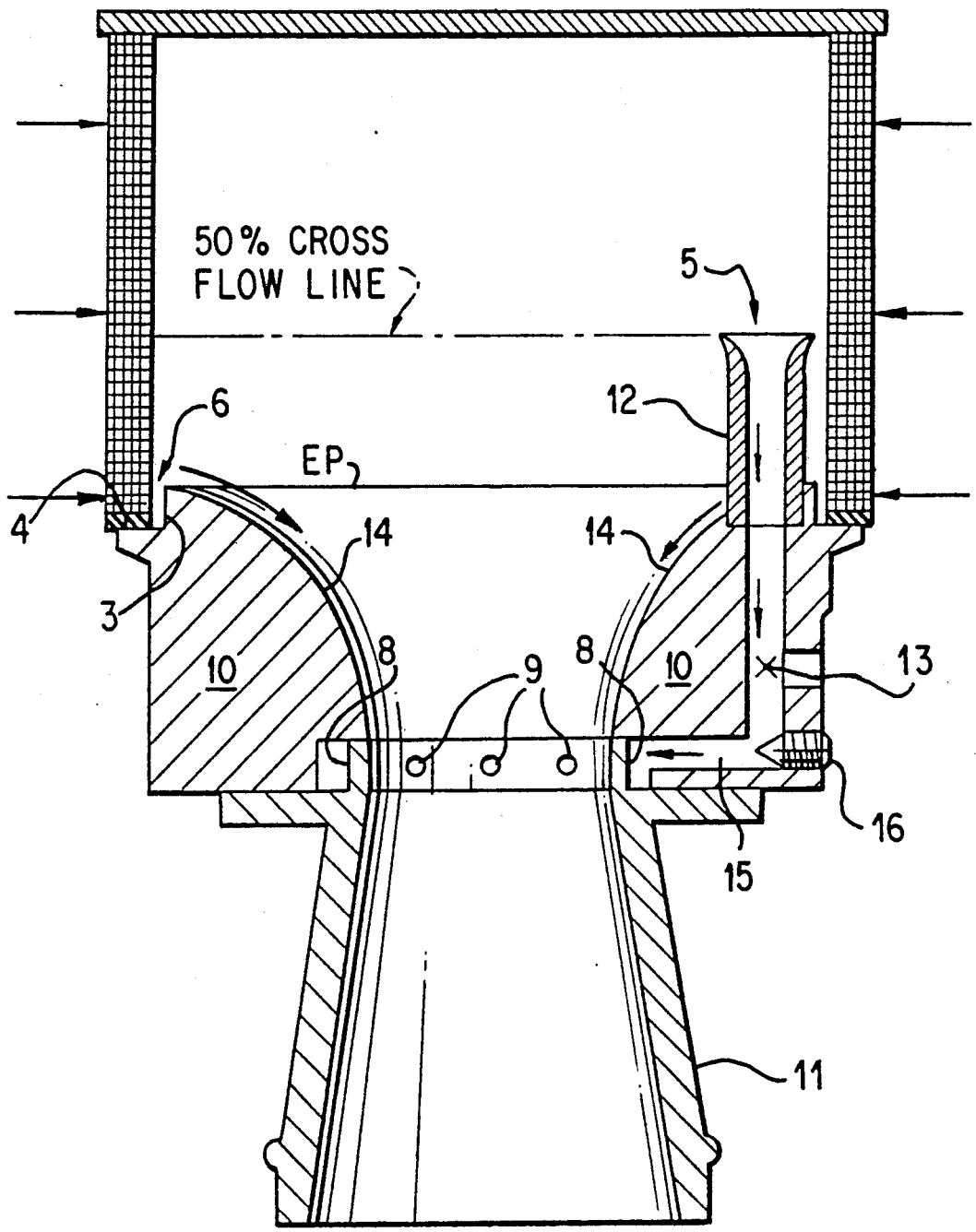
FIG. 6 is a view similar to FIG. 5 showing the split of air flow through the sample system and the main venturi.

For the family of flow meters sizes 0.5" to 5" throat diameter of venturi (TD), both the flow through the sample path and the main flow through the venturi throat are variable with engine requirement (see FIG. 6). The flow through the sample path will vary from zero to maximum value of about 0.7 poundals (W/g) per minute.

My mass air flow meter has a fluidically correct shaping of venturi (10) and tapered sample tube (12) for the most correct reading of air flow rates.

a. The bell inlet (14) of the venturi (10) has a minimum radius (R1) equal to at least ½ of the throat diameter (TD) of said venturi and the form thereof is determined by a cubic equation. A tangent line from the outermost edge of the bell inlet forms a minimum angle (A1) of at least 70 degrees to the axis of the venturi. (see FIG. 5.)

b. The Recovery system (11) is tapered to increasing diameter preferably about 14 degrees included angle for best possible air flow pressure recovery. 96.6% of pressure is recovered at the exit plane of said exit cone. (see FIG. 5.)

In tests performed on a stock 1990 Mustang engine (5.0 liter High Output) an increase of at lease 25 horse power was achieved by simply removing the production mass air flow meter and replacing same with my mass air flow meter.

Figure 8:
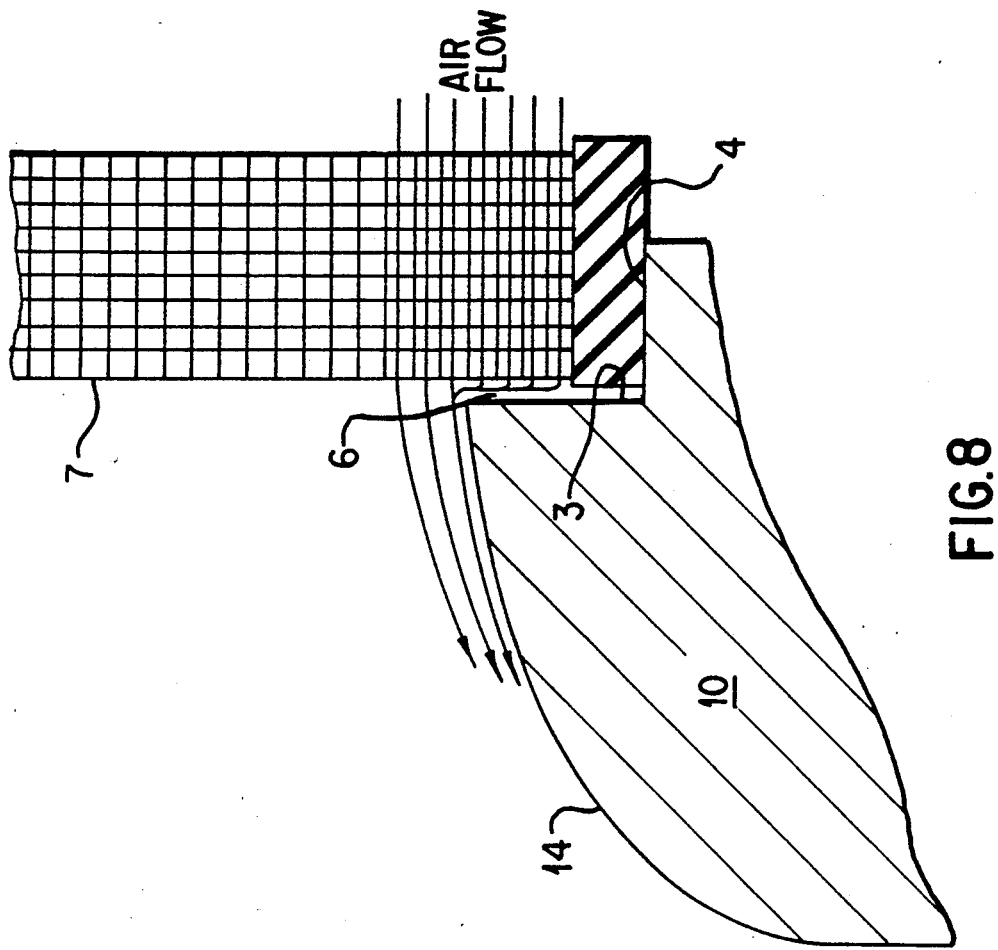
FIG. 8 is a fragmentary vertical sectional showing the interface construction with the air cleaner.
Figure 7:
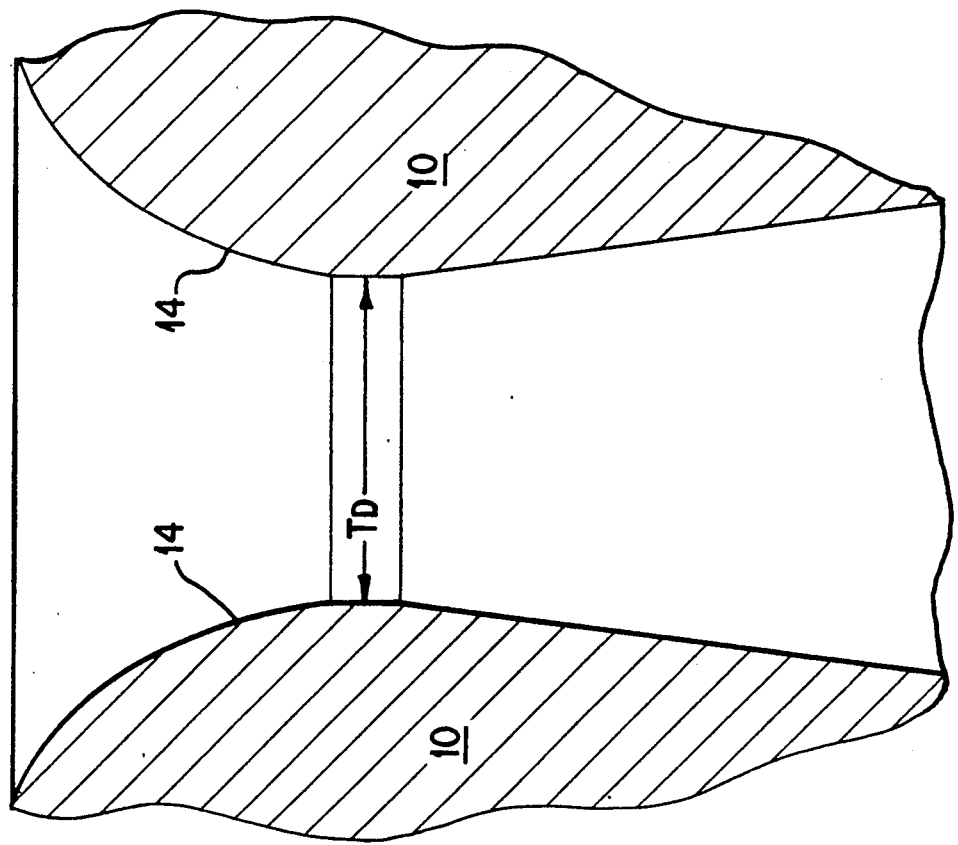
FIG. 7 is a schematic view showing the expected pressure drops for my family of mass air flow meters from 1" to 5" throat diameters.

My mass air flow meter has a unique air cleaner mount which (see FIG. 8) consists of means radially outward of the bell inlet (4) for receiving an end of the air cleaner (7) and disposing it below the entrance plane (EP) of said bell mouth (14). Such means include a circumferential shoulder (3) and a radial shoulder (4) which provide a static pressure gap (6) disposed between the inside circumference of the air cleaner and the circumferential shoulder (3). Said filter mount forces incoming air to attach to the bell mouth surface so as to increase the intake efficiency. The closely attached air cleaner provides both air filtration and radial direction to the intake flow. This isolates the intake of the meter from under-hood air currents that are induced by rotating accessories, engine fan, and vehicular movement that otherwise would increase transduction noise. See FIG. 5.

The main inlet is stepped up to capture the air flow over the approaching inlet lip to allow for the inlet air to attach to the inlet immediately after crossing the air filter. This keeps the air attached to the inlet horn and allows for much better intake efficiency. See FIG. 8.

Figure 5:
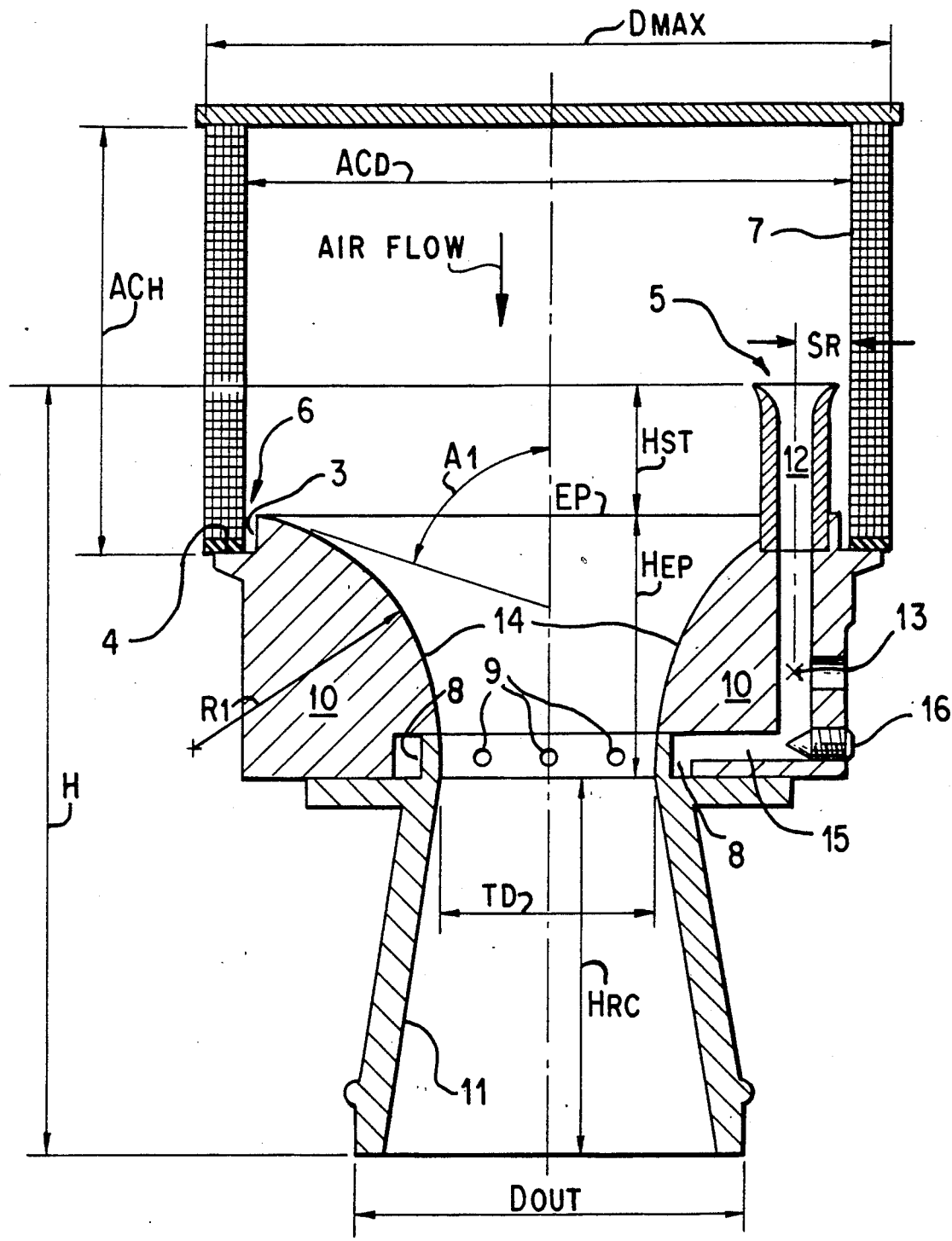
FIG. 5 is a vertical sectional view of my air flow meter showing some of the construction details thereof.

In my mass air flow meter the height of the tapered sample tube (Hst) above the bell entrance plane (EP) shall be a minimum of 0.5 times the throat diameter (TD) (see FIG. 5). In any case at least above the 50% cross flow line (50% C.F.L.; see FIG. 6) By 50% cross C.F.L. I mean that 50% of the cross flow of air through the air cleaner is below this line.

The inlet of the tapered sample tube (12) shall have a trumpet bell (5) shape, be unguarded and be disposed radially inside the air cleaner a predetermined minimum distance (Sr) and a predetermined minimum distance (Hst) axially upstream from the entrance plane (EP) of the bell inlet equal to at least 0.5 of the throat diameter (TD).

Sr is the radial distance inward from said circumferential shoulder (3) to the axis of the sample tube (12). Hst is the height of the sample tube above the entrance plane (EP)

In my mass air flow meter the bypass tapered sample tube (12) is tapered to decreasing diameter (preferably about 0.7 to 2.0 degrees) in the direction of air flow to eliminate cyclonic effects of the flow which otherwise would become high noise. (see FIG. 12)

In my mass air flow meter the air sensing element (13) is positioned at the end of the tapered sample tube (12) such that the tube is still tapering for at least 1 diameter beyond the element. (see FIG. 5)

In my mass air flow meter a transverse conduit (15) with a flow trimming device (16) receives the flow from the sample tube (12) and delivers same to the sample collection chamber (8)

Figure 9:
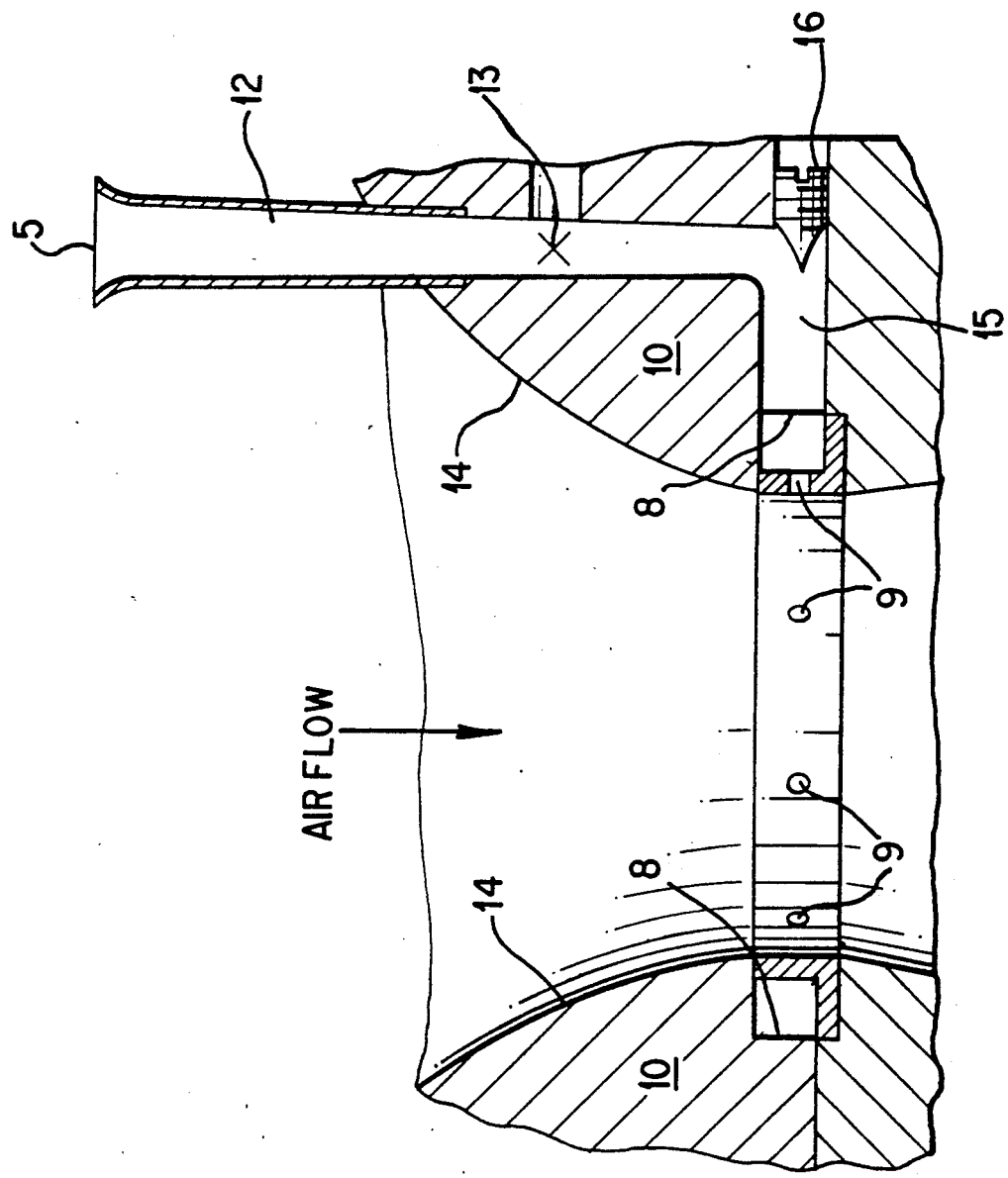
FIG. 9 is a schematic view with parts in section of the sampling system.

In my mass air flow meter the sample collecting chamber (8) downstream from the tapered sample tube at the minimum throat diameter of the venturi receives the flow from the transverse conduit (15) and collects same and has a flow restriction outlet (9) to the main air flow flowing through the minimum diameter (TD) of the venturi. The ratio of volume of the collecting chamber to the volume of sample tube being between 3 to 1 and 14 to 1 depending upon the filter time constant (see FIGS. 9, 10A and 10B). The filter time constant varies depending upon the intake characteristics of the target engine.

| engine cylinders | R C time constant MS. (milliseconds) | ratios of volume |
| --- | --- | --- |
| 8 and 6 | 12 to 44 | 4:1 to 9:1 |
| 5 and less | 44 to 90 | 8:1 to 14:1 |

In my mass air flow meter the maximum flow through the tapered sample tube (12) is made to be a constant at maximum flow for a given family of flow meter sizes.

The actual flow through the tapered sample tube is close to 0.7 poundals/Min at design flow rate. This flow rate limits the flow regime that the sample tube will see.

The following are two typical mass air flow meters form my family of mass air flow meters;

a. The ATZ-1000 3.0 in. dia. venturi is 1000 C.F.M. (S.T.P.) The flow rate through the tapered sample tube is approximately 8.7 C.F.M. (S.T.P.) while through the venturi is 991.3 C.F.M. (S.T.P.) the pressure signal at the minimum venturi diameter is approximately 28.0 inches of H2O.

PFT 1 2.75 in. dia. venturi is 800 C.F.M. (S.T.P.) The flow rate through the tapered sample tube is approximately 8.7 C.F.M. (S.T.P.) while through the venturi is 791.3 C.F.M. (S.T.P)

Description of advantages of my mass air flow meter.

All internal combustion engines operate in at least 3 specific phases of air intake into the engine.

I. Air intake condition idle to 40% throttle.

Characterized by near constant flow through the intake system. High intake manifold vacuum and throttling valve being at low angles.

II. Air intake condition rapid change in throttle demand.

Changing throttle angle means the operator is demanding the engine to either accelerate or decelerate and the engine must respond very quickly.

III. Air intake condition Above 40% to Wide Open Throttle.

Characterized by high pulsations of flow and even flow reversals. Intake manifold is pulsating from 2 in. Hg. gage vacuum to 1 in. Hg. gage pressure My invention handles all of the above 3 operating phases (I, II and III).

Figure 13:
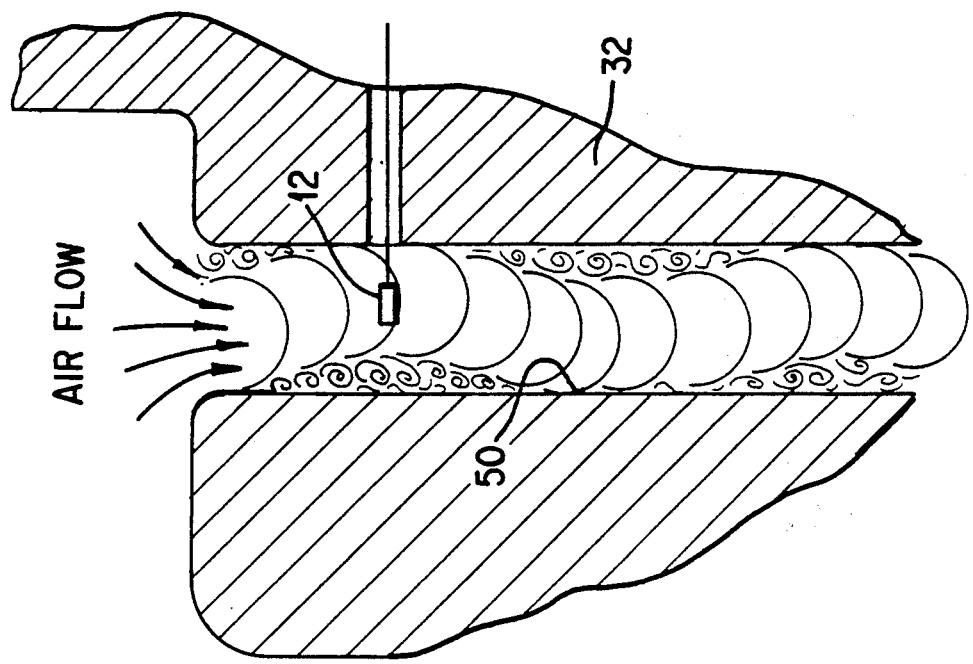
FIG. 13 is a view similar to FIG. 12, but showing such air flow in the sample system of a prior art mass air flow meter.

In respect to Phase I Air intake condition (Idle to 40% throttle):

A. Prior art bypass units have always had high noise (3 to 20% of signal). As shown is FIG. 13, the noise in the bypass system is mainly due to cyclonic type flow in the nontapered tube which rambles about the sample tube, produces eddies, random wall attachment and results in inaccurate sensing. High noise adversely affects the measuring accuracy of the prior art unit which in turn, adversely affects emissions control, engine efficiency, and fuel economy.

Figure 12:
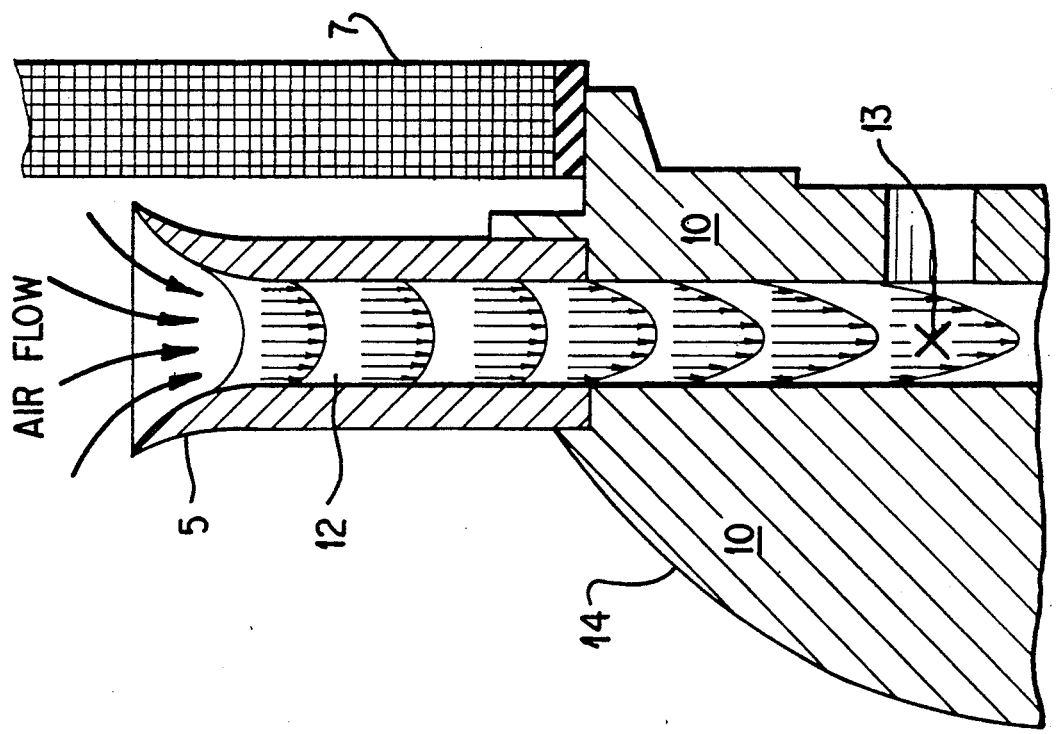
FIG. 12 is visualized flow diagrams showing air flow through my sampling system.

B. In my air flow meter the tapered sample tube is continuously tapered to focus the center flow on the sensing device as a consequence a of the profiled velocity front through the sampling tube my Air flow meter has low noise (0.5 to 3% of signal)
   (i). cross flows, perpendicular surfaces, or close objects have no affect upon capture of sample air
   (ii). the taper constantly accelerates the flow to insure attachment thereof to the tapered wall while maximizing the acceleration at the center of the flow stream to produce a parabolic velocity front (P.V.F.) as shown in FIG. 12, whereby eddies cannot form and the sensing element always sees a non-fluctuating maximum accelerated center flow stream. Therefore because the element always sees the same P.V.F. flow transduction noise is minimized while accuracy and repeatability are maximized, the result is that the control computer has a stronger more accurate signal; engine emissions are minimized, while engine efficiency, and fuel economy are both maximized.

In respect to Phase II and III air intake conditions: transient acceleration/deceleration and Wide Open Throttle operating areas.

A. Prior art systems do not have a flow averaging system for air intake conditions II and III. Instead they follow the air flow response poorly and give false readings of flow in the high pulsation flow areas. This makes the control system even more confused and makes poor performance and even worse emissions.

Figures 10A, 10B:
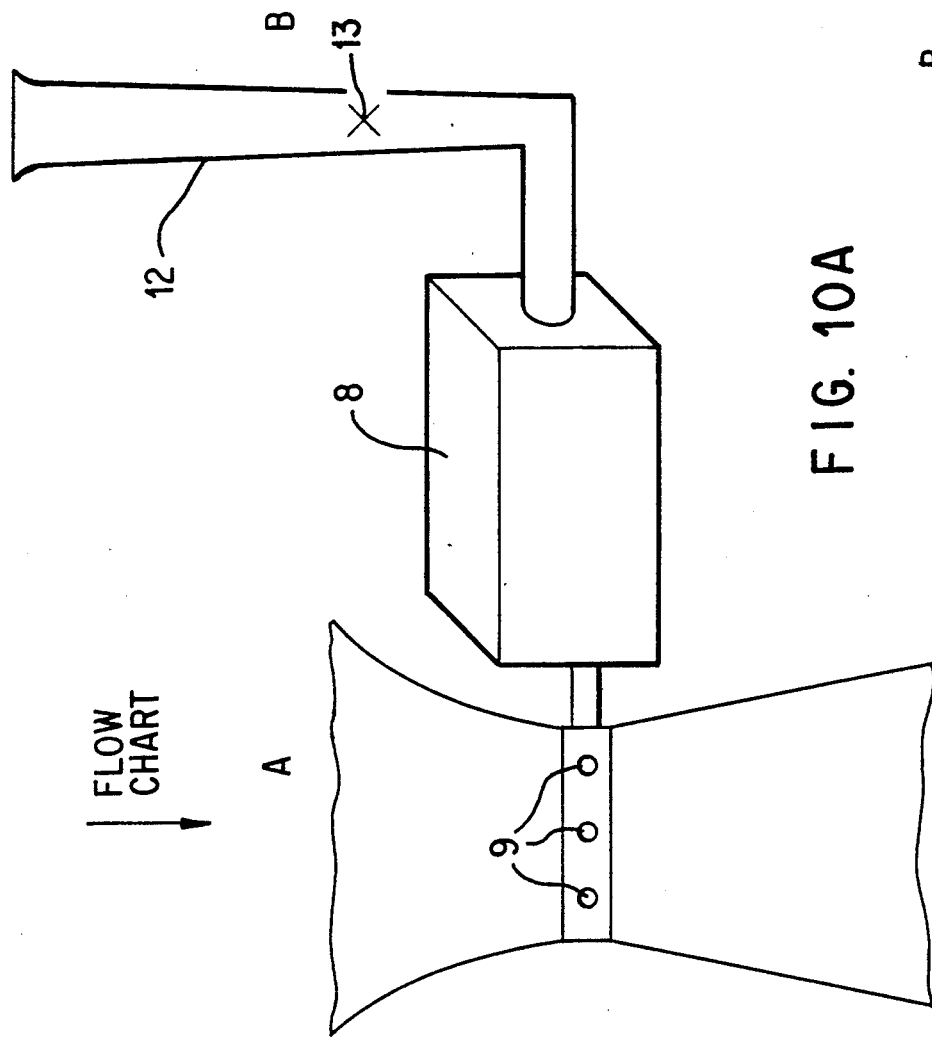
FIGS. 10A and 10B are schematic views illustrating respectively the pneumatic circuit and the electrical equivalent of the sampling system used in my air flow meter.

B. My air flow meter uses the sample flow system as an air flow equivalent to an electrical low pass filter having an R C time constant. The mechanical sampling system is illustrated in FIG. 10A while the analogous electronic circuit is shown in FIG. 10B where the collecting chamber providing the equivalent electrical capacitance said flow restriction means providing the equivalent electrical resistance in series circuit with said capacitance and said sample tube, hot wire transducer, flow trimmer and transverse conduit providing the equivalent electrical coupling resistance whereby the flow through the sample path read by the hotwire transducer represents the average value of the main flow through the venturi throat.

The graphs in FIGS. 11A and 11B illustrate the flow response to a quiet signal such as idle to ⅓ total throttle opening when the flow is stabile. The average flow is identical to the actual flow and no differences are seen.

Figure 11D:
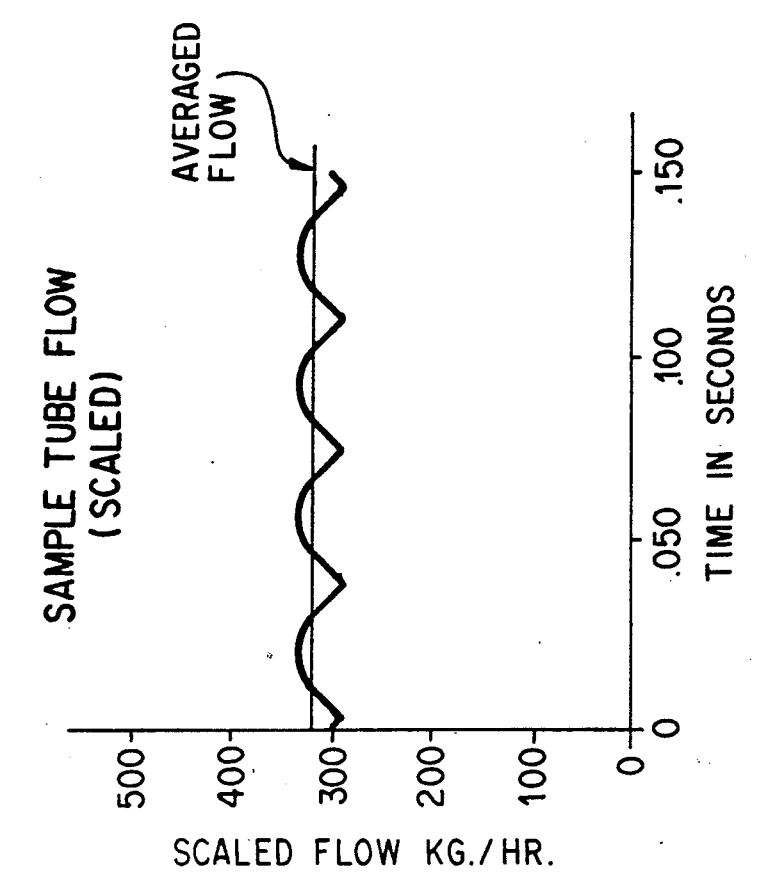
Figure 11C:
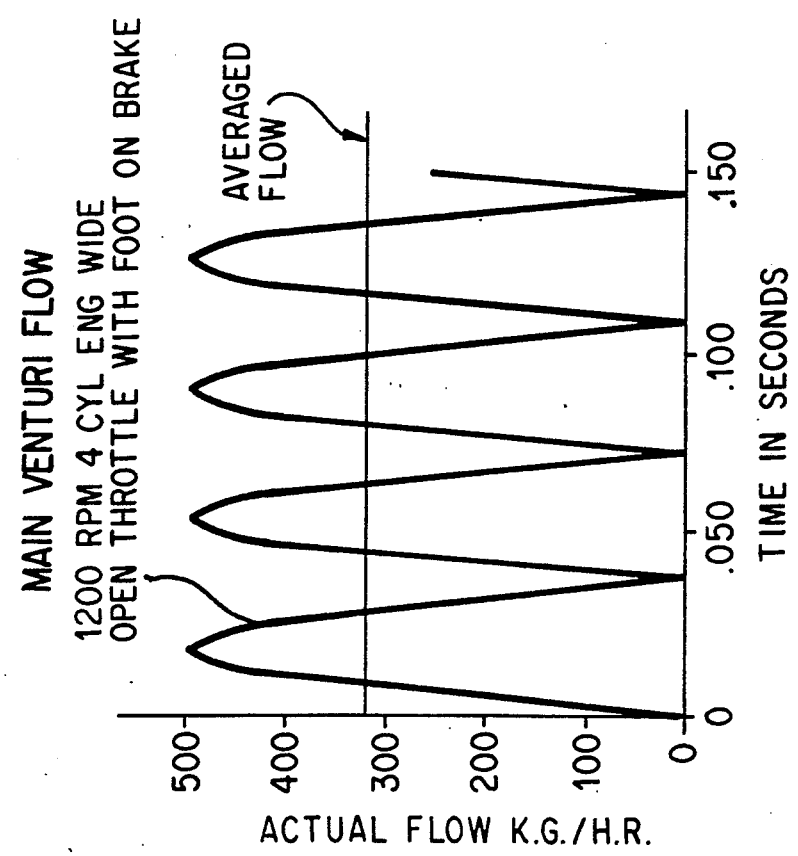

The graphs in FIGS. 11C and 11D illustrates what the element sees when the flow is pulsing. The main venturi sees the entire pulsing flow and the flow restriction means lets the flow in the collection chamber lag slightly behind the main flow. This lag allows the sample flow to only vary slightly from the air flow average and becomes a filter that will block fluctuations that are cyclic and above a frequency of 15 to 30 hertz. Large throttle angle changes are averaged and the flow output lags the actual transient by 0.03 to 0.09 seconds however the transfer function of the intake manifold is closer to the flow outputted by the device and the engine is less prone to over react to these changes and produce air fuel spiking.

The volume of the collection chamber changes for various applications;

The ratio of volume of the collecting chamber to the volume of sample tube being between 3 to 1 and 14 to 1 depending upon the filter time constant. The filter time constant varies depending upon the intake characteristics of the target engine

| target engine engine cylinders | time delay MS. (milliseconds) | ratio of volumes |
|---|---|---|
| 8 and 6 | 12 to 44 | 4:1 to 8:1 |
| 5 and less | 44 to 90 | 8:1 to 14:1 |

The following is a description of how a typical one of my mass air flow meters functions:

A 3 inch device divides the air flow in the approximate ratio of 114 to 1 (air through the throat to air through the tapered sample tube)

The tapered sample tube is brought above the entrance plane (EP) of the device to allow for better capture of the sample air. The sample air resembles an infinite source because
   a. The tapered sample tube entrance is disposed above the 50% air flow line not allowing cross currents to affect the sample air stream.
   b. the incoming air velocity is at a maximum of 40 degrees from the axis of the sample tube assuring a clean capture of the air.
   c. A sharp edged trumpet cone is used for better capture efficiency of the sample air.

The sample flow is drawn through the sample path and is collected at the minor diameter by a specially made distribution ring and collection chamber which has a volume of 4 to 14 times that of the tapered sample tube in front of the sensing element. The flow is formed into a parabolic velocity front by the tapered sample tube and is focused on the element (see FIG. 12)

This flow measured is the average main venturi flow and enables the engine controller to read the average air charge much more accurately with out synchronous sampling techniques from the engine computer.

Advantages of the tapered sample tube
   a. maximize the signal to noise ratio at the hotwire because of tapering of sample tube and disposition of inlet mouth thereof
   b. the pressure drop is controlled across the sample tube making the flow always stay in the laminar regime.
   c. profiled flow means that the element that is used to sense the flow may be of any size or shape because the flow profile is doesn't have any random movements in it.

Advantages of sample collection system and flow restriction ring
   a. minimize the downstream effects of the air flow through the meter prior art the signal from the meter was affected by downstream bends and devices in the air flow. i.e. Throttle plate angle affects transduction curve. Different air cleaner elements affect the transducer curve.

b. Venturi flow is averaged by the restriction and the volume of the ring design, which is unique in obtaining an averaged flow signal.

c. minimize the effect of reverse flow when the engine is pulsing during wide open throttle operation.

What I claim is:

1. Improvement in a mass air flow meter for internal combustion engines having a hollow elongated body having a venturi therein, a sample tube associated with said body for receiving a flow of sample air therethrough, the entire air source for an engine being split into a main flow path through the venturi and into a sampling path through the sample tube, an air flow transducer disposed in said sample tube, the flow through the sample tube downstream from said transducer being recombined with the main flow of air through said venturi, said improvement comprising the following structure for improving the flow dynamics of the air flow through the sampling path including expansion of the dynamic range and increase of the signal to noise ratio resulting in improved engine performance, fuel efficiency, and emission control:

(a) said sample tube being tapered in decreasing area in the direction of air flow through the sample tube;

(b) the transducer being disposed near the minimum area of said sample tube;

(c) said sample tube having a length equal to more than 6 times the maximum cross sectional dimension thereof near the transducer;

(d) a collecting chamber downstream from the sample tube for receiving the output flow therefrom;

(e) flow restriction means opening to the minimum throat diameter of said venturi and serving as the outlet of said collecting chamber;

(f) said collecting chamber serving as an accumulator for the outlet flow from said sample tube and having a volume more than twice the volume of the sample tube above said transducer;

(g) the total cross sectional area of said flow restriction means being about half that of the minimum cross sectional area of said sample tube near the transducer so that the pressure drop across said flow restriction means is at least 1.5 times that across the length of the sample tube above said transducer; and (h) said collecting chamber and said flow restriction means providing a pneumatic equivalent of a low pass R C filter which decouples the high turbulence in the main flow through the venturi, averages same and provides a scaled down profiled flow through the sample tube for measurement by said transducer, said measurements having an accuracy of ±2% of reading error.

2. Improvement in a mass air flow meter for internal combustion engines as claimed in claim 1 in which the taper of the sample tube is uniform over the length thereof.

3. Improvement in a mass air flow meter for internal combustion engines as claimed in claim 1 in which the ratio of the length of said sample tube to the minimum diameter thereof is between 8 to 1 and 12 to 1.

4. Improvement in a mass air flow meter for internal combustion engines as claimed in claim 1 in which the taper of the sample tube is within a range of 0.5 to 2.0 degrees included angle.

5. Improvement in a mass air flow meter for internal combustion engines as claimed in claim 4 in which said taper of the sample is 0.9 degrees included angle.

6. Improvement in a mass air flow meter for internal combustion engines as claimed in claim 1 in which said collecting chamber is an annular chamber disposed about the minimum throat diameter of the venturi and in which said flow restriction means comprises equally circumferentially spaced-apart apertures through the venturi wall.

7. Improvement in a mass air flow meter for internal combustion engines as claimed in claim 1 further comprising a transverse conduit disposed downstream of the sample tube and upstream from the collection chamber, the volume of said transverse conduit being added to that of said collecting chamber in providing the C equivalent of said R C time constant.

8. Improvement in a mass air flow meter for internal combustion engines as claimed in claim 7 further comprising a manually adjustable air flow trimmer at the intersection of the downstream end of the sample tube and the inlet end of the transverse conduit, said flow trimmer being used to fine tune the R of the low pass R C filter.

9. Improvement in a mass air flow meter for internal combustion engines as claimed in claim 1 in which the inlet to the sample tube has a trumpet shaped mouth inlet to enhance the capture of sample air and to enhance the signal to noise ratio.

10. Improvement in a mass air flow meter for internal combustion engines as claimed in claim 1 in which said body has an entrance plane coincident with the upstream end of said venturi and the sample tube has such length that it extends above said entrance plane such a distance that the inlet end thereof is disposed above a 50% cross-flow line in respect to the total cross flow of air entering the venturi from said air source.

11. Improvement in a mass air flow meter for internal combustion engines as claimed in claim 1 in which the sample tube has such length that the inlet end thereof extends above the transducer by a distance of between 6 and 12 diameters (minimum diameter of the sample tube near the transducer).

12. Improvement in a mass air flow meter for internal combustion engines as claimed in claim 1 in which said transducer is located above the outlet end of the sample tube by a distance of at least 1 diameter (minimum diameter of sample tube near the transducer).

13. Improvement in a mass air flow meter for internal combustion engines as claimed in claim 1 further comprising means at the outer cirumferential wall of said body below said entrance plane for holding an air filter in place thereon, said holding means including a radial wall and a cylindrical wall for forming, with the air cleaner, a static pressure gap whereby to enhance attachment of the incoming air to said bell shaped entrance.

14. Improvement in a mass air flow meter for internal combustion engines as claimed in claim 1 further comprising a recovery cone downstream from said venturi expanding in diameter in the direction of flow by an amount so as to provide an included conical angle of between 8 and 20 degrees.

15. Improvement in a mass air flow meter for internal combustion engines as claimed in claim 14 in which said expanding diameter has an included conical angle of 14 degrees.

16. Improvement in a mass air flow meter for internal combustion engines as claimed in claim 14 in which the minimum throat diameter of the venturi is sized to give at maximum expected airflow a maximum of 28 in. H2O pressure drop from (atmosphere to the minimum throat diameter) and a maximum pressure drop of 13 in. H2O (from atmosphere to the outlet end of the recovery cone).

17. Improvement in a mass air flow meter for internal combustion engines as claimed in claim 1 in which the pressure drop over the length of the sample tube above said transducer is less than 10 inches of H2O, whereby, the flow of sample air in said sample tube remains profiled in the laminar regime.

18. Improvement in a mass air flow meter for internal combustion engines as claimed in claim 1 in which the volume of said sample path downstream of the flow transducer including that of the collecting chamber in relation to the volume of the sample tube upstream of the transducer is in the ratio of 2.5 to 1 and 15 to 1 depending upon the time delay required for the intake characteristics of the target engine, said time delay being between 12 and 90 milliseconds.

* * * * *